United States Patent [19]
Kosarzecki

[11] 4,223,693
[45] Sep. 23, 1980

[54] COUNTERBALANCE VALVE

[75] Inventor: Constantine Kosarzecki, Schaumburg, Ill.

[73] Assignee: Modular Controls Corporation, Villa Park, Ill.

[21] Appl. No.: 928,545

[22] Filed: Jul. 27, 1978

[51] Int. Cl.³ .................... F15B 13/042; G05D 7/00

[52] U.S. Cl. .................... 137/106; 91/420; 251/52

[58] Field of Search .................... 91/420; 251/50, 52; 137/106, 87

[56] References Cited

U.S. PATENT DOCUMENTS

| | | | |
|---|---|---|---|
| 2,667,896 | 2/1954 | Kanuch | 251/52 X |
| 2,698,730 | 1/1955 | Ensminger | 251/52 |
| 3,015,316 | 1/1962 | Thomas | 91/420 |
| 3,665,810 | 5/1972 | Parrett | 91/420 |
| 3,799,032 | 3/1974 | Honeycutt | 91/453 X |
| 3,817,154 | 6/1974 | Martin | 91/420 |
| 3,955,478 | 5/1976 | Feucht | 92/85 B |
| 3,972,557 | 8/1976 | Hudston et al. | 91/420 X |
| 4,026,192 | 5/1977 | Noren et al. | 92/85 B |

*Primary Examiner*—Irwin C. Cohen
*Attorney, Agent, or Firm*—Trexler, Wolters, Bushnell & Fosse, Ltd.

[57] ABSTRACT

A counterbalance valve assembly for use in a hydraulic system of the type including a hydraulic cylinder for raising and lowering a load provides gradual and continuous exhaustion of hydraulic fluid from the cylinder to facilitate smooth lowering of the load. The assembly includes a counterbalance valve having an outer barrel and an inner barrel forming an annular channel therebetween through which the exhausted fluid passes. The outer barrel includes an inner valve seat and the inner barrel includes an outer relief valve surface which engages in the annular channel to form a relief valve. The inner barrel is movable in a linear direction within the outer barrel for opening and closing the relief valve as the load is lowered. To avoid abrupt changes in the exhausted cylinder fluid flow rate, and thus to avoid abrupt variations in the load lowering rate, the relief valve surface has a long tapered configuration rendering the exhausted fluid flow rate less sensitive to inner barrel movement. Additionally, the inner barrel includes a flange of slightly less dimension than the inner diameter dimension of the outer barrel resulting in an annular space therebetween. Fluid is therefore allowed to fill an outer barrel chamber opposite the inner barrel forming a dashpot means for dampening inner barrel movement.

10 Claims, 3 Drawing Figures

COUNTERBALANCE VALVE

BACKGROUND OF THE INVENTION

The present invention is directed generally to a counterbalance or motion control valve assembly. The present invention is more particularly directed to a counterbalance valve assembly for use in a hydraulic system of the type which includes a hydraulic actuating cylinder for raising and lowering loads.

Hydraulic systems for raising and lowering loads are well-known in the art. Such systems generally include a hydraulic actuating cylinder which is powered in both directions for raising and lowering a load. Systems of this general nature are usually incorporated into hoists or cranes.

When a load is to be raised, the actuating cylinder is powered through the receipt of hydraulic fluid into a first cylinder port for forcing the cylinder piston, and thus the load, in an upward direction in a conventional manner. For lowering the load, the cylinder is powered in the opposite direction by the receipt of hydraulic fluid through a second cylinder port for driving the cylinder piston, and thus the load, downwardly. Simultaneously, the hydraulic fluid within the cylinder used to raise the load is exhausted through the first cylinder port. Obviously, any load which is being lowered will aid the system hydraulic pump in driving the cylinder piston downwardly and forcing the hydraulic fluid from the first cylinder port. Unfortunately, in certain situations, the load may be sufficiently heavy to cause the cylinder piston to exhaust the hydraulic fluid at a flow rate which exceeds the system pump capacity for filling the cylinder, to thus cause a "runaway" condition to exist.

To prevent a runaway condition from occurring, hydraulic systems of the above-mentioned variety have been provided with a counterbalance valve which is designed to restrict the flow rate of the exhausted fluid. Such counterbalance valves generally include a relief valve which is operative in response to the fluid pressure within the cylinder second port supply line to meter the flow rate of the exhausted hydraulic fluid flowing from the cylinder first port. A decrease in the pressure within the cylinder second port supply line indicates that the load is driving the exhausted cylinder fluid out of the first port at a rate which is greater than the pump supply rate. Hence, to avoid a runaway condition, the flow of hydraulic fluid from the cylinder first port is checked by the relief valve.

While counterbalance valves incorporating relief valves have been generally successful in preventing a runaway condition, they have exhibited some problems. The major shortcoming of prior counterbalance valves has been that the relief valves are extremely sensitive to a decrease in the fluid pressure within the second cylinder port hydraulic fluid supply line so as to cause abrupt checking of the hydraulic fluid being exhausted from the cylinder first port. Such abrupt checking causes the load to drop in a series of abrupt steps rather than in a gradual and continuous manner. Obviously, such a condition is to be avoided to prevent damage to the system as a result of the great degree of inertia which results when a heavy load is abruptly stopped.

It is therefore a general object of the present invention to provide a new and improved counterbalance valve assembly for use in a hydraulic system of the type which raises and lowers a load.

It is a further object of the present invention to provide a new and improved counterbalance valve assembly which provides gradual and continuous exhaustion of hydraulic fluid from a hydraulic cylinder as a load is lowered to thereby provide gradual and continuous lowering of a load.

It is a still further object of the present invention to provide a counterbalance valve assembly which provides gradual variations in the hydraulic cylinder exhausted fluid flow rate responsive to the fluid pressure within the hydraulic cylinder fluid supply line.

SUMMARY OF THE INVENTION

The present invention therefore provides a counterbalance valve for use in a hydraulic system of the type which includes a hydraulic cylinder for raising a load when filled with hydraulic fluid at a first cylinder port and for lowering a load when filled with hydraulic fluid at a second port while fluid is exhausted from the cylinder through the first port wherein the counterbalance valve provides a gradual and continuous exhaustion of the fluid from the first cylinder port for gradual and continuous lowering of the load. The counterbalance valve assembly comprises a valve body having a first port adapted for fluid connection to the cylinder first port, a pilot port adapted for fluid connection to the cylinder second port, a third port, and a valve bore in fluid communication with the first, pilot, and third ports. A counterbalance valve is disposed within the valve bore and includes an outer barrel and an inner barrel. The outer barrel has a predetermined inner diameter dimension and an inner valve seat. The inner barrel is disposed within the outer barrel and has a reduced diameter portion forming an annular channel which provides fluid connection between the first port and the third port, an outer relief valve surface arranged to engage the outer barrel valve seat within the annular channel, and an annular flange of lesser dimension than the outer barrel inner diameter dimension forming an annular space therewith communicating with the annular channel. The inner barrel is movable within the outer barrel in a first linear direction for separating the valve seat and the relief valve surface and is biased in a second direction for engagement of the valve seat and the relief valve surface. The inner barrel further includes a piston surface communication with the pilot port for moving the inner barrel in the first direction responsive to fluid pressure received through the pilot port as the cylinder receives fluid into the second cylinder port during lowering of the load to provide the fluid connection from the first port to the third port through the annular channel for exhausting fluid from the cylinder first port. The relief valve surface is tapered to provide gradual variations in the rate of fluid exhaustion from the cylinder as the inner barrel moves in the first and second linear direction. The annular space between the outer barrel inner dimension and the inner barrel flange form a dashpot piston means for resisting abrupt movement of the inner barrel. The tapered relief valve surface and the annular space thereby provide gradual and continuous exhaustion of cylinder fluid from the first port to the third port through the annular channel to provide gradual and continuous lowering of the load.

BRIEF DESCRIPTION OF THE DRAWINGS

The features of the present invention which are believed to be novel are set forth with particularity in the appended claims. The invention, together with the further objects and advantages thereof, may best be understood by making reference to the following description taken in conjunction with the accompanying drawings, in the several figures of which like reference numerals identify like elements, and in which:

DESCRIPTION OF THE PREFERRED EMBODIMENT

Figure 1:
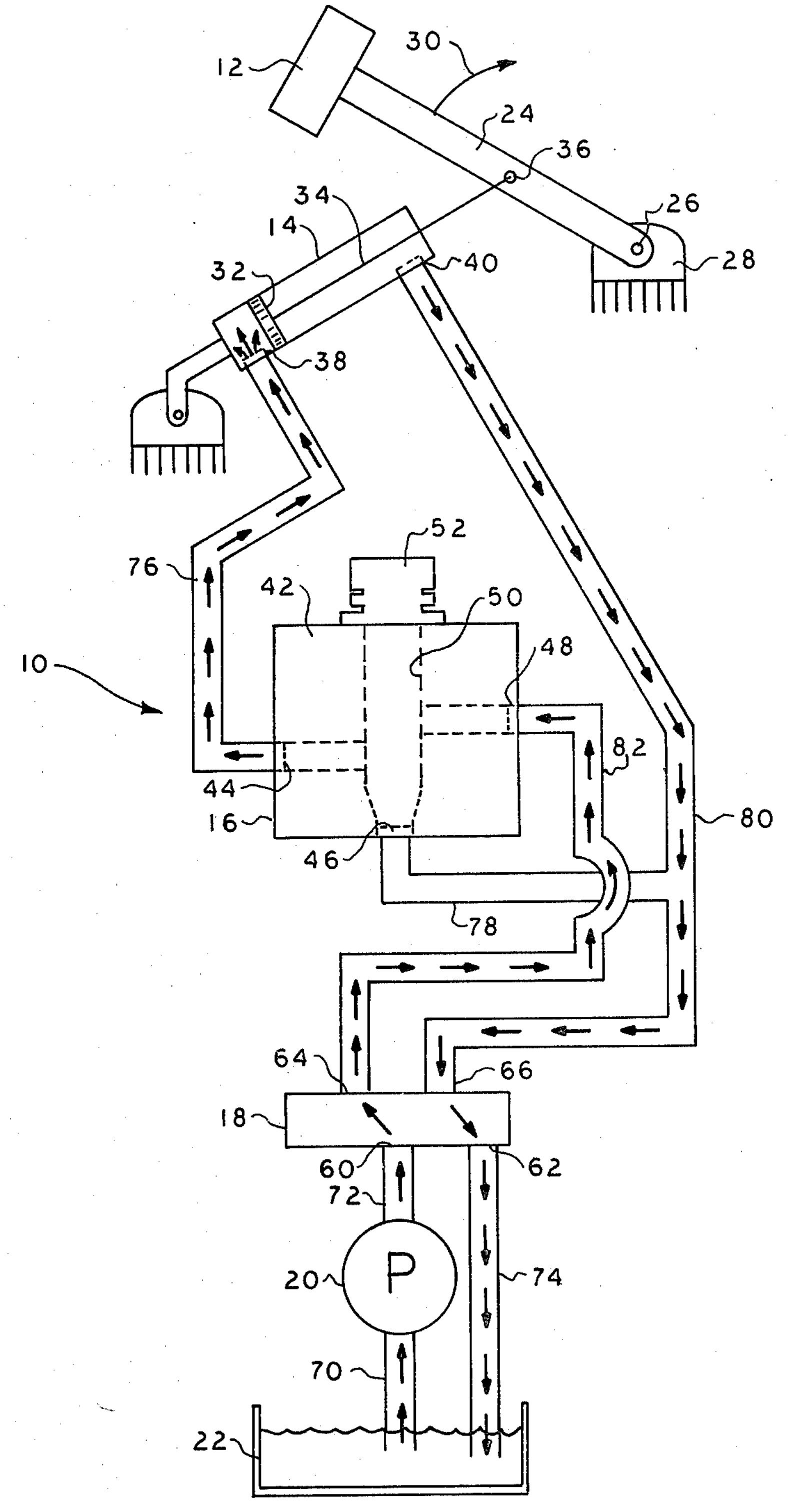
FIG. 1 is a schematic representation of a hydraulic system incorporating a counterbalance valve assembly embodying the present invention wherein the load is shown in a lowered position prior to the raising of the load.

Referring now to FIG. 1, the hydraulic system 10 thereshown for raising and lowering a load 12 generally includes a hydraulic cylinder 14, a counterbalance valve assembly 16 embodying the present invention, a fluid flow direction control valve 18, a hydraulic fluid pump 20, and a hydraulic fluid tank 22. The load 12 is shown, for illustrative purposes, attached to one end of a pivot arm 24 which pivots about a point 26 contained on a stationary bracket 28. As shown in FIG. 1, the load 12 is in its lowered position and is to be raised to an upward position by pivotal movement of pivot arm 24 about pivot point 26 in the direction of arrow 30.

The cylinder 14 includes a piston 32 and a piston rod 34 which extends from the piston 32 to the pivot arm 24 whereat it is pivotally connected at a pivot point 36. The hydraulic cylinder 14 also includes a first cylinder port 38 and a second cylinder port 40.

The counterbalance valve assembly 16 includes a valve body 42. The valve body 42 has a first port 44 referred to as a cylinder port, a second port 46 referred to as a pilot port, and a third port 48 referred to as a valve port. The valve body 42 also includes a valve bore 50 which is in fluid communication with the first, second and third ports 44, 46 and 48 respectively. Contained within the valve bore 50 is a counterbalance valve 52 embodying the present invention and which includes a relief valve for controlling the rate of hydraulic fluid flow out of the first cylinder port 38 of the hydraulic cylinder 14 as the load is lowered. The counterbalance valve assembly 16 will be described in detail subsequently with reference to FIG. 3.

The fluid flow direction control valve 18 is of a type well known in the art. It includes a first pair of ports 60 and 62, and a second pair of ports 64 and 66. The fluid flow direction control valve 18 provides selective fluid connection between respective ones of the first pair of ports 60, 62 with respective ones of the second pair of ports 64, 66. The control valve 18 is therefore provided within the system for controlling the direction of fluid flow throughout the system in a manner which will become apparent subsequently.

The pump 20 provides hydraulic fluid flow throughout the system. It is coupled between the direction control valve 18 and the hydraulic fluid tank 22 by lines 70 and 72. A return line 74 connected between port 62 of valve 18 and the tank 22 returns hydraulic fluid to the tank.

The first port 44 of the counterbalance valve assembly is fluidly connected to the first cylinder port 38 of cylinder 14 by a line 76. The second port 46 is fluidly connected to the second cylinder port 40 by a branch line 78 and a line 80 which fluidly connects the second cylinder port 40 with port 66 of valve 18. The third port 48 is fluidly connected to port 64 of valve 18 by a line 82.

When the load 12 is to be raised from its lowered position as shown in FIG. 1, the hydraulic fluid flow direction control valve 18 provides fluid communication between its ports 60 and 64 and between its ports 62 and 66. Upon actuation of the pump 20, hydraulic fluid flows from tank 22, through the pump 20, through the valve 18 from port 60 to port 64, and then to the third port 48 of the counterbalance valve assembly through line 82. The hydraulic fluid then flows through the counterbalance valve assembly from the third port 48 to the first port 44 and to the first cylinder port 38 through line 76. As fluid is pumped into the first cylinder port 38, the cylinder piston 32 is caused to raise which in turn causes the pivot arm 24 to pivot in the direction of arrow 30 for raising the load 12. As piston 32 rises, the hydraulic fluid within cylinder 14 previously used to lower the load is exhausted through the second cylinder port 40 and is returned to the hydraulic fluid tank 22 through line 80, valve 18 and line 74.

Figure 2:
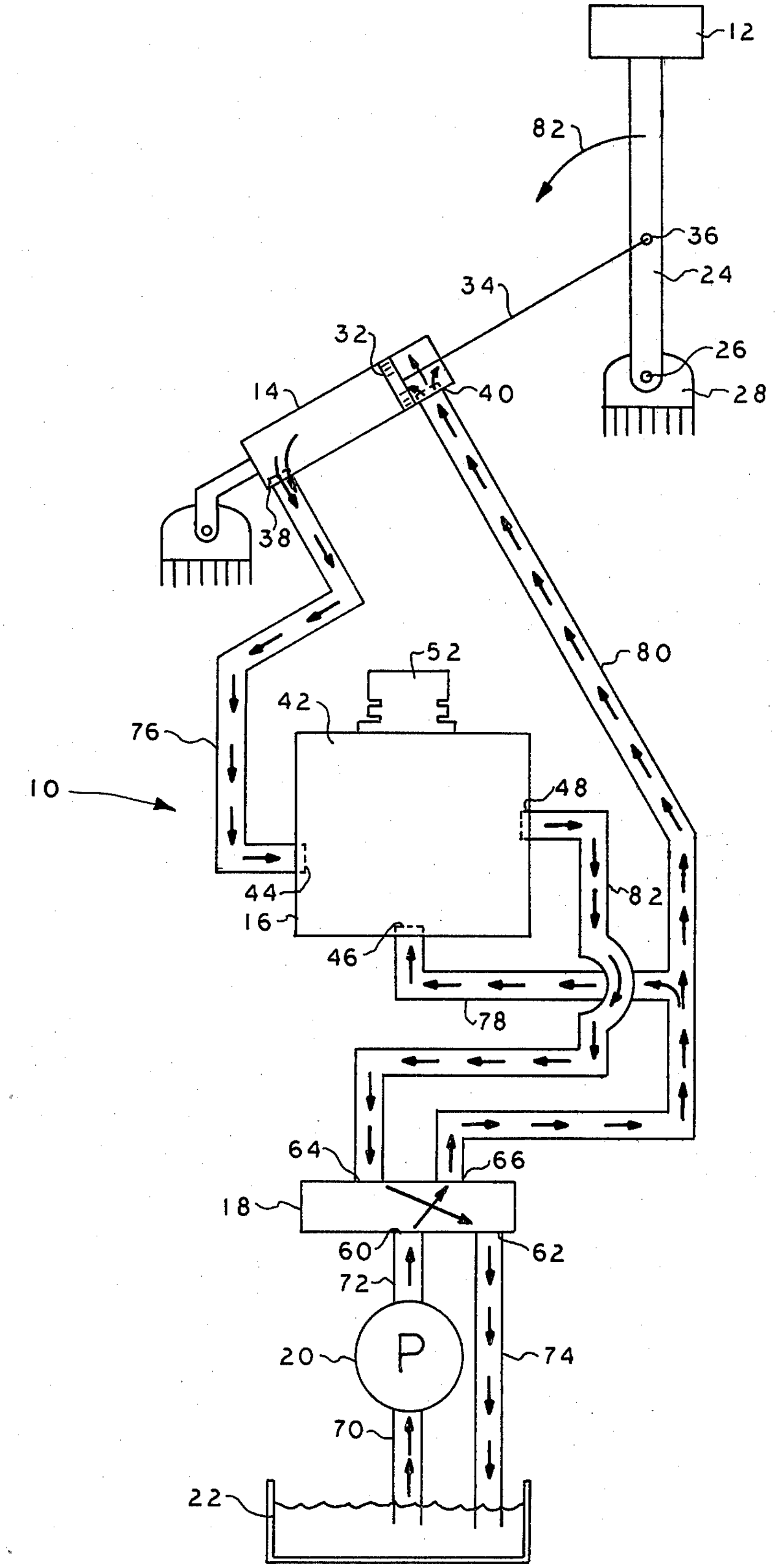
FIG. 2 is a schematic representation of the hydraulic system of FIG. 1 illustrating the load in a raised position prior to the lowering of the load.

FIG. 2 shows the system with the load 12 in its raised position. When the load 12 is to be lowered, the direction control valve 18 provides fluid communication between its ports 60 and 66 and between its ports 64 and 62. When the pump 20 is actuated, hydraulic fluid flows from the tank 22, through pump 20, through the control valve 18 from port 60 to port 66, and to the second cylinder port 40 through line 80. Hydraulic fluid also flows through the branch line 78 to the pilot port 46.

After the cylinder space above piston 32 is filled with the hydraulic fluid, the piston 32 will be caused to move downwardly. As piston 32 moves downwardly, the pivot arm 24 will pivot in the direction of arrow 82 for lowering the load 12. Also, as piston 32 moves downwardly, the fluid within cylinder 14 within the cylinder space below piston 32 which raised the load is exhausted from the cylinder through first cylinder port 38. The exhausted hydraulic fluid flows from the first cylinder port 38 to the first counterbalance valve assembly port 44 through line 76. The exhausted hydraulic fluid then flows through the counterbalance valve assembly from port 44 to the third port 48. The exhausted hydraulic fluid then flows from the third port 48 to port 64 of direction control valve 18, through the direction control valve 18 from port 64 to port 62, and then back to the hydraulic fluid tank 22 through return line 74.

As the load 12 is lowered, the fluid pressure within line 80 is constantly monitored by the counterbalance valve 52 at the pilot port 46. When the pressure within the branch line 78, and thus the pressure within the fluid supply line 80 decreases, indicating the beginning of a runaway condition, the relief valve within the counterbalance valve 52 will gradually restrict the flow rate of the exhaust hydraulic fluid so that the exhausted fluid flow rate is gradually decreased. As a result, the hydraulic fluid within cylinder 14 is exhausted through the first cylinder port 38 gradually and continuously to thereby provide gradual and continuous lowering of the load 12 and thus avoiding a runaway condition. As will be seen subsequently with reference to FIG. 3, the relief valve contained within the counterbalance valve 52 is provided with means for dampening to control operation to avoid abrupt restriction of the exhausted fluid flow rate. Hence, the load 12 will be lowered in the previously referred to gradual and continuous manner without step-like motion.

Figure 3:
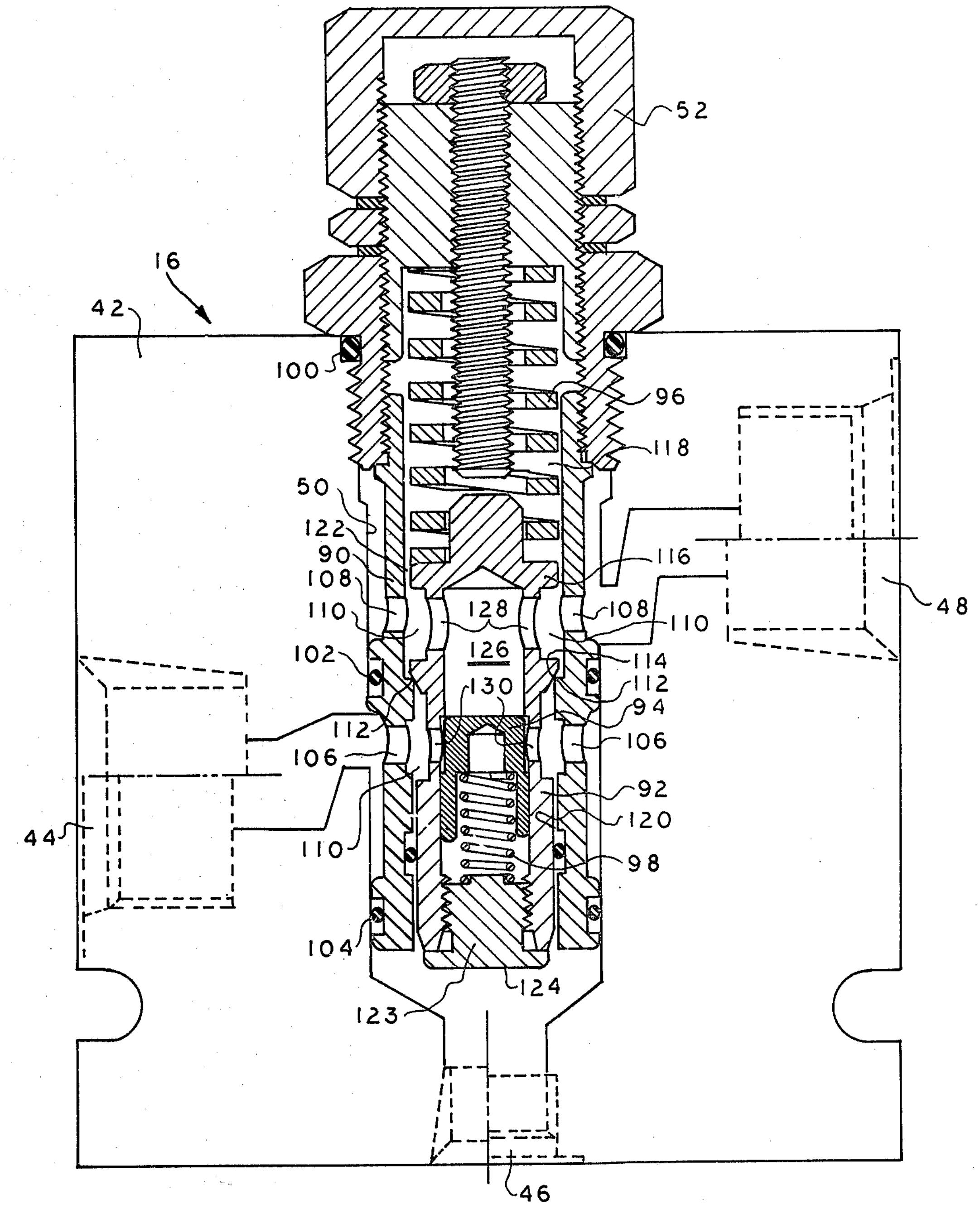
FIG. 3 is a cross sectional view of a counterbalance valve assembly embodying the present invention.

Referring now to FIG. 3, it illustrates in detail a counterbalance valve assembly embodying the present invention. As previously mentioned, the counterbalance valve assembly 16 includes a valve body 42 having a first port 44, a second or pilot port 46, a third port 48, and a valve bore 50. The valve bore 50 is in fluid communication with the first port 44, second port 46, and third port 48, and a valve bore 50 which contains the counterbalance valve 52.

The counterbalance valve 52 includes an outer barrel 90, an inner barrel 92, a poppet or valve means 94, and biasing springs 96 and 98. The outer barrel 90 is sealed at various locations with respect to the valve bore 50 by a plurality of O-rings 100, 102, and 104. The outer barrel 90 includes a first plurality of apertures 106 which are in fluid communication with the first port 44 and a second plurality of apertures 108 which are in fluid communication with the third port 48.

The inner barrel 92 is of lesser dimension than the inner dimension of the outer barrel 90 to form an annular channel 110 therebetween. The out barrel 90 includes an inner annular valve seat 112 and the inner barrel 92 includes an outer annular relief valve surface 114 to form the relief valve of the counterbalance valve 52. The valve seat 112 and relief valve surface 114 are arranged to engage within the annular channel 110.

The inner barrel 92 also includes an annular flange 116 which divides the interior of the outer barrel 90 into a first chamber 118 and a second chamber 120 wherein the inner barrel 92 is disposed. The outer dimensions of the annular flange 116 is of slightly less dimension than the inner diameter dimension of the outer barrel 90 thus forming an annular space 122 therebetween. The annular space 122 communicates with the annular channel 110 and the first chamber 118.

The inner barrel 92 is arranged to move in first and second linear directions within the outer barrel 90. The spring 96 biases the inner barrel in the second linear direction (towards the bottom of FIG. 3) to cause the valve seat 112 and relief valve surface 114 to engage within the annular channel 110. The inner barrel 92 is caused to move in the first linear direction (towards the top of FIG. 3) responsive to fluid pressure received at the pilot port 46. To that end, the inner barrel 92 is provided with a threaded cap 123 having piston surface 124 against which the fluid pressure acts. When the pressure of the fluid received at pilot port 46 exceeds the pressure exerted on the inner barrel 92 by the spring 96, the inner barrel will be caused to move in the first linear direction. Obviously, the fluid pressure required to move the inner barrel in the first linear direction may be referred to a predetermined pressure limit determined by the spring 96.

The inner barrel 92 also includes a central channel 126 which communicates with the annular channel 110 by first and second sets of apertures 128 and 130.

The poppet 94 is disposed within the inner barrel 92 and is also movable in the first and second linear directions. The poppet 94 is biased in the first linear direction by the spring 98. When poppet 94 is biased in the first direction as shown, it blocks apertures 130 and thus the fluid communication between the first plurality of apertures 106 to the central channel 126.

In operation, and referring again to FIGS. 1 and 2, when the load is raised, hydraulic fluid flows through the counterbalance valve assembly 16 from the third port 48 to the first port 44. The hydraulic fluid flows between these two ports in the following manner. When hydraulic fluid is received at port 48, it flows into the second plurality of apertures 108, through the portion of annular channel 110 above the relief valve formed by the valve seat 112 and the relief valve surface 114, through apertures 128 and into the central channel 126. When the fluid pressure within central channel 126 is sufficient to overcome the pressure exerted on poppet 94 by spring 98, poppet 94 will be caused to move in the second linear direction to unblock apertures 130 and to permit the hydraulic fluid flow through apertures 130, through the portion of the annular channel 110 below the relief valve, through apertures 106 and out the first port 44. As previously described, the hydraulic fluid flowing from port 44 is transferred to the first cylinder port 38 for raising the cylinder piston 32 and thus the load.

For lowering the load, and as previously described, hydraulic fluid is introduced into the cylinder 14 through the second cylinder port 40. After the space within the cylinder above the piston 32 is filled, the hydraulic fluid within cylinder 14 which raised the load is simultaneously exhausted out of the first cylinder port 38. The exhausted fluid flows through the counterbalance valve assembly from the first port 44 to the third port 48. As the hydraulic fluid flows between ports 44 and 48, its rate of flow is controlled by the relief valve within the counterbalance valve 52 responsive to the fluid pressure received at pilot port 46.

As the hydraulic fluid flows into port 44, it flows through apertures 106 into the portion of annular channel 110 below the relief valve formed by the valve seat 112 and the relief valve surface 114. The pressure of the hydraulic fluid within the lower portion of annular channel 110 exerted against the relief valve surface 114 together with the pressure of the hydraulic fluid at pilot port 46 acting against piston surface 124 will coact to cause the inner barrel 92 to move in the first linear direction as the inner barrel moves in the first linear direction, the valve seat 112 and the relief valve surface 114 will separate to allow the hydraulic fluid to flow from the lower portion of annular channel 110 into the upper portion of the annular channel. The hydraulic fluid will then flow through apertures 108 and out the third port 48.

As previously mentioned, when the fluid pressure within line 80, and thus the fluid pressure within the branch line 78 connected to pilot port 46, decreases indicating the beginning of a runaway condition, the flow rate of the exhausted hydraulic fluid must be restricted to avoid the runaway condition. In order to provide the required gradual restriction of the exhausted fluid flow to afford gradual and continuous lowering of the load, the counterbalance valve assembly of the present invention includes means for gradually restricting the flow of the exhausted fluid responsive to the detection of the beginning of a runaway condition. To that end, the annular space 122 permits hydraulic fluid to flow from the annular channel 110 into the first chamber 118 of the outer barrel 90 to serve as a dashpot means for dampening the movement of the inner barrel. Also, the relief valve surface 114 is provided with a relatively long tapered configuration having a small included angle to require substantial movement of the inner barrel for closing the relief valve and restricting the flow of the exhaust hydraulic fluid. As a result, with the dashpot means formed by the annular space 122 and the first chamber 118 providing dampened and gradual movement of the inner barrel and with the substantially long tapered configuration of the relief valve surface 114 requiring substantial movement of the inner barrel 92 for closing the relief valve, the dashpot means and tapered relief valve surface configuration are operative individually and collectively to provide gradual variations in the exhausted hydraulic fluid flow rate. As a result, the exhausted hydraulic fluid will flow from the hydraulic cylinder 14 back to the hydraulic fluid tank 22 in a gradual and continuous manner to the ultimate end that the load 12 will be lowered in a corresponding gradual and continuous manner.

The present invention therefore provides a new and improved counterbalance valve assembly for use in a hydraulic system of the type which includes a hydraulic cylinder for raising and lowering a load. The counterbalance valve assembly of the present invention provides gradual restriction of the exhausted fluid flow from the cylinder as the load is lowered so that the load is lowered in a continuous and gradual manner. With the provision of the dashpot means and the long tapered relief valve surface configuration of the relief, the counterbalance valve is precluded from causing abrupt variations in the rate of exhausted fluid flow to thereby preclude step-like lowering of the load. As a consequence, the counterbalance valve assembly of the present invention provides a distinct advantage over prior art counterbalance assemblies in that it prevents damage to the hydraulic system and/or to the load which otherwise might occur due to the inertia formed as a result of step-like lowering of a heavy load.

While a particular embodiment of the present invention has been shown and described, modifications may be made, and is therefore intended in the appended claims to cover all such changes and modifications which fall within the true spirit and scope of the invention.

The invention is claimed as follows:

1. A counterbalance valve assembly for directing hydraulic fluid flow in a forward direction to raise a load, and for directing hydraulic fluid flow in a reverse direction to lower the load, said counterbalance valve assembly providing gradually controlled reverse fluid flow to provide gradual and continuous lowering of the load, said counterbalance valve assembly comprising: a valve body including a first port, a second port adapted to receive pilot fluid pressure, a third port adapted for connection to a fluid source, and a valve bore in fluid communication with said first, second, and third ports; and a counterbalance valve disposed within said valve bore and comprising an outer barrel including a first chamber portion having a predetermined inner diameter dimension and a second chamber portion, an inner barrel disposed within said second chamber portion, said inner barrel being arranged for moving in a first and second linear direction and including a circumferential flange formed on said inner barrel separating said first and second chambers, said flange being of lesser dimension than said first chamber inner dimension forming an annular space therebetween, said annular space being the sole communication between said first and second chambers, said inner barrel also including a piston surface in fluid communication with said second port, and valve means disposed within said inner barrel and arranged to move in said first and second linear directions, said valve means being movable in said second linear direction responsive to fluid flow into said third port for providing fluid communication between said first and third ports to direct fluid flow in said forward direction for raising the load, said inner barrel being movable in said first linear direction responsive to pilot fluid pressure against said piston surface and including relief valve means thereon for providing controlled fluid flow from said first port to said third port in said reverse direction as said inner barrel moves for lowering the load and said annular space between said inner barrel flange and said outer barrel inner dimension forming with said first chamber a dashpot to provide dampened controlled movement of said inner barrel in both said first and second linear directions to provide gradual reverse fluid flow and continuous uninterrupted lowering of the load.

2. A valve assembly as defined in claim 1 wherein said inner and outer barrels form an annular channel for conducting the hydraulic fluid, and wherein said annular channel is also in fluid communication with said annular space.

3. A valve assembly as defined in claim 2 wherein said relief valve means is within said annular channel and comprises a relief valve surface carried by said inner barrel, and a valve seat carried by said outer barrel arranged to engage said relief valve surface, and wherein said relief valve surface and said valve seat separate responsive to said inner barrel movement to provide flow of fluid in said reverse direction through said channel.

4. A valve assembly as defined in claim 3 further including a spring biasing said inner barrel in said second direction to cause said relief valve surface to engage said valve seat when the fluid pressure received by said piston surface is below a predetermined pressure limit.

5. A valve assembly as defined in claim 4 wherein said spring is disposed within said first chamber.

6. A counterbalance valve assembly for directing hydraulic fluid flow in a first direction for raising a load, and for directing hydraulic fluid flow in a reverse direction for lowering the load, said counterbalance valve assembly providing gradual and continuous lowering of the load comprising: a valve body having a first port, a pilot port adapted for fluid connection to pilot fluid pressure, a third port adapted for connection to a fluid source, and a valve bore in fluid communication with said first, pilot, and third ports; and a counterbalance valve disposed within said valve bore and including an outer barrel and an inner barrel, said outer barrel having a predetermined inner diameter dimension and an inner valve seat, said inner barrel having pressure responsive valve means for establishing fluid flow in said forward direction between said first and third ports for raising the load, said inner barrel being disposed within said outer barrel and having a reduced diameter portion forming an annular channel providing fluid connection between said first and third ports for fluid flow in said reverse direction, an outer relief valve surface formed on said inner barrel and arranged to engage said valve seat within said annular channel, an outer barrel chamber, and an annular flange of lesser dimension than said outer barrel inner diameter dimension forming an annular space therewith in fluid communication with said annular channel and said outer barrel chamber, said annular space being the sole means of communication with said outer barrel chamber, said inner barrel being movable in a first direction into said outer barrel chamber for separating said valve seat and said relief valve surface and biased by biasing means in a second direction for engagement of said valve seat and said relief valve surface, said inner barrel further including a piston surface in fluid communication with said pilot port for moving said barrel in said first direction responsive to fluid pressure received through said pilot port during lowering of the load to provide said fluid flow in said reverse direction from said first port to said third port through said annular channel for lowering the load, said relief valve surface being tapered to provide gradual variations in the rate of fluid flow in said reverse direction as said inner barrel moves, and said annular space between said outer barrel inner dimension and said inner barrel flange and said outer barrel chamber forming a dashpot means for resisting abrupt movement of said inner barrel in both said first and second directions, said tapered relief valve surface and said annular space thereby providing gradual and continuous fluid flow in said reverse direction from said first port to said third port through said annular channel to provide gradual and continuous lowering of the load.

7. A counterbalance valve assembly as defined in claim 6, said biasing means comprising a spring for biasing said inner barrel in said second direction.

8. A counterbalance valve assembly as defined in claim 6 wherein said valve means includes a movable poppet within said inner barrel, wherein said inner barrel includes a central channel providing fluid connection between said first and third ports for fluid flow in said forward direction from said first port to said third port for raising the load, and wherein said poppet is biased by biasing means to block said central channel fluid connection and move responsive to fluid flow into said third port for enabling said fluid connection between said third and first ports for raising the load.

9. A counterbalance valve assembly for directing a hydraulic fluid flow in a forward direction to move a load in one direction, and for directing fluid flow in a reverse direction to move the load in the opposite direction, said counterbalance valve assembly providing gradually controlled fluid flow in the reverse direction to provide gradual and continuous movement of the load, said counterbalance valve comprising: a valve body including a first valve port, a second valve port adapted for fluid communication with a source of fluid, a third valve port adapted for connection to a pilot fluid pressure, and a valve bore in fluid communication with said first, second, and third valve ports and comprising a first chamber portion having a predetermined inner diameter dimension and a second chamber portion, inner barrel means disposed within said second chamber portion, said inner barrel means including pressure responsive valve means for providing fluid flow in said forward direction from said third port to said first port for moving the load in said one direction and said inner barrel means being arranged for moving in first and second linear directions and including a circumferential section separating said first and second chambers, said circumferential section being of lesser dimension than said first chamber inner dimension forming an annular space therebetween, said annular space being the sole means of communication with said first chamber, said inner barrel means also including a piston surface in fluid communication with said second port and relief valve means between said first and third valve port, resilient means connected with and urging said inner barrel means in said second linear direction for normally closing said relief valve means, said inner barrel means being movable in said first linear direction responsive to pilot fluid pressure against said piston surface into said first chamber for providing controlled fluid flow in said reverse direction from the first port, past said relief valve, and to said third port to exhaust the fluid back to the fluid source for moving the load in said opposite direction and said annular space between said inner barrel means circumferential section and said inner dimension and said first chamber forming a dashpot to provide dampened controlled movement of said inner barrel means for movement in both said first and second linear directions to promote smooth fluid flow in said reverse direction and continuous movement of the load.

10. A valve assembly as defined in claim 9 wherein said relief valve means comprises a long tapering conical valve surface carried by said inner barrel and an annular valve seat within said valve bore means, said valve surface having a small included angle, for further promoting smooth flow of the fluid with respect to said valve seat in said reverse direction.

* * * * *